United States Patent
Lee

(10) Patent No.: US 9,825,517 B2
(45) Date of Patent: Nov. 21, 2017

(54) CONTROLLING MODULE, SWITCH-MODE POWER SUPPLY APPARATUS, AND PEAK CURRENT MODE CONTROLLING METHOD OF A SWITCH-MODE POWER SUPPLY APPARATUS

(71) Applicant: DELTA ELECTRONICS, INC., Taoyuan (TW)

(72) Inventor: Sheng-Ta Lee, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 15/338,589

(22) Filed: Oct. 31, 2016

(65) Prior Publication Data
US 2017/0279344 A1    Sep. 28, 2017

(30) Foreign Application Priority Data
Mar. 22, 2016  (TW) .............................. 105108730 A

(51) Int. Cl.
*H02M 7/155*  (2006.01)
*H02M 1/00*   (2006.01)
(Continued)

(52) U.S. Cl.
CPC ............ *H02M 1/00* (2013.01); *H02M 3/04* (2013.01); *H02M 7/06* (2013.01); *H02M 7/44* (2013.01); *H02M 2001/0003* (2013.01)

(58) Field of Classification Search
CPC .......... H02M 7/06; H02M 7/44; H02M 7/155; H02M 3/04; H02M 1/00
(Continued)

(56) References Cited

U.S. PATENT DOCUMENTS 6,844,710 B2 * 1/2005 Lipcsei ................. H02M 1/088
                                              323/284
7,719,248 B1 * 5/2010 Melanson ........... H02M 1/4225
                                              323/222
(Continued)

FOREIGN PATENT DOCUMENTS

EP           0617501          9/1994

OTHER PUBLICATIONS

European Search Report dated Jun. 20, 2017 from corresponding application No. EP16197283.1.

*Primary Examiner* — Adolf Berhane
*Assistant Examiner* — Nusrat Quddus
(74) *Attorney, Agent, or Firm* — Hauptman Ham, LLP

(57) ABSTRACT

A controlling module includes a current-command generating unit for generating reference current signal based on an output voltage of a power conversion module, a current sensor configured to sense an inductor current of the power conversion module and generate current sense signal, a current comparator for generating current compare signal when the current sense signal equaling to the reference current signal, and an off-time controller for generating off-time control signal based on an input voltage and the output voltage of the power conversion module. The controlling module further includes a time-base counter and a peak-current controlling unit. The time-base counter receives the current compare signal and the off-time control signal, and generates a trigger signal when an off-time interval established by the off-time control signal elapses. The peak-current controlling unit makes a power switch of the power conversion module in a conduction state based on the trigger signal.

9 Claims, 6 Drawing Sheets

(51) Int. Cl.
*H02M 3/04* (2006.01)
*H02M 7/06* (2006.01)
*H02M 7/44* (2006.01)

(58) Field of Classification Search
USPC ....... 363/21.05, 21.07, 21.1–21.18, 123–127
See application file for complete search history.

(56) References Cited

U.S. PATENT DOCUMENTS

| | | | |
|---|---|---|---|
| 7,906,949 B1* | 3/2011 | Sutardja | H02M 3/157 323/282 |
| 2003/0001546 A1 | 1/2003 | Van Auken | |
| 2008/0205104 A1* | 8/2008 | Lev | H05B 37/0263 363/98 |
| 2009/0160422 A1 | 6/2009 | Isobe et al. | |
| 2015/0362937 A1 | 12/2015 | Wang | |

* cited by examiner

CONTROLLING MODULE, SWITCH-MODE POWER SUPPLY APPARATUS, AND PEAK CURRENT MODE CONTROLLING METHOD OF A SWITCH-MODE POWER SUPPLY APPARATUS

BACKGROUND

Technical Field

The present disclosure relates to a power supply technique. More particularly, the present disclosure relates to a switch-mode power supply apparatus and a controlling module and a peak current mode controlling method thereof.

Description of Related Art

The electronic products need electric power to operate. Switch-mode power supplies are currently used to supply power to electric products as they are lighter, smaller, and with high efficiency. Compared to voltage mode control, current mode control exhibits highly stable feedback loop and a faster load transient response.

The average current mode and peak current mode controls are commonly used for the current mode control. For switch-mode power supplies operating in the peak current mode control, slope compensation is necessary to increase the stability.

For an input voltage of a comparably small variety (e.g. a DC input), designers can decide a fixed slope to meet the requirements. However, for a time-variant input voltage (e.g. an AC input), such as slope compensation used in PFC, the slope has to be adaptive. However the implementation is challenging requiring adaptive slope compensation for different load conditions.

SUMMARY

According to one aspect of the present disclosure, a peak current mode controlling method is adapted for a switch-mode power supply apparatus. In particular, in the peak current mode controlling method, an off-time control signal is generated based on an input voltage and an output voltage of a power conversion module and a voltage compare signal is generated based on a reference voltage against the output voltage. In addition, a reference current signal is generated based on the voltage compare signal and a current compare signal is generated when an inductor current of the power conversion module equaling to the reference current signal. Furthermore, a trigger signal is generated when an off-time interval established by the off-time control signal elapses. A pulse-width-modulating signal for controlling operation of the power conversion module is triggered according to the trigger signal.

According to another aspect of the present disclosure, a controlling module is provided. The controlling module is applied to control a power conversion module receiving an input voltage and then generating an output voltage. The controlling module includes a current-command generating unit, a current sensor, an off-time controller, a time-base counter, and a peak-current controlling unit. The current-command generating unit is electrically connected to the power conversion module, wherein the current-command generating unit generates a reference current signal based on the input voltage. The current sensor is configured to sense an inductor current of the power conversion module for generating a current sense signal. The current comparator is configured to generate a current compare signal when the current sense signal equaling to the reference current signal. The off-time controller generating an off-time control signal based on the input voltage and the output voltage. The time-base counter receiving the current compare signal and the off-time control signal and generating a trigger signal when an off-time interval established by the off-time control signal elapses. The peak-current controlling unit configured to make a power switch of the power conversion module in a conducting state in accordance with the trigger signal.

According to further another aspect of the present disclosure, a switch-mode power supply apparatus is provided. The apparatus includes a power conversion module and a controlling module. The power conversion module receiving an input voltage and then generating an output voltage includes an inductor and a power switch electrically connected to the inductor. The controlling module includes a current-command generating unit, a current sensor, an off-time controller, a time-base counter, and a peak-current controlling unit. The current-command generating unit is electrically connected to the power conversion module and configured to generate a reference current signal based on the output voltage. The current sensor is configured to generate a current sense signal based on an inductor current passing through the inductor. The current comparator is electrically connected to the current-command generating unit and the current sensor and configured to generate a current compare signal when the current sense signal equals to the reference current signal. The off-time controller is configured to generate an off-time control signal based on the input voltage and the output voltage. The time-base counter is electrically connected to the current comparator and the off-time controller. The time-base counter receives the current compare signal and the off-time control signal and generates a trigger signal when an off-time interval established by the off-time control signal elapses. The peak-current controlling unit is configured to make the power switch in a conducting state based on the trigger signal.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
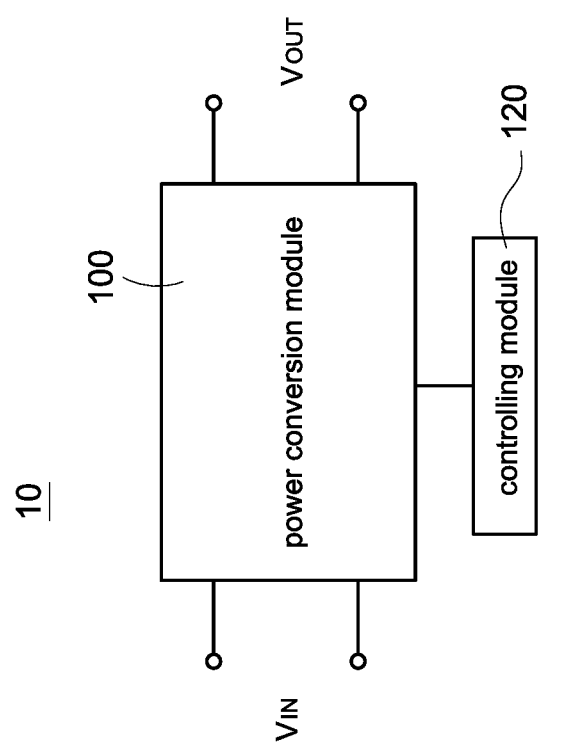
FIG. 1 is a circuit block diagram of a switch-mode power supply apparatus according to a first embodiment of the present disclosure.

Reference is made to FIG. 1, which is a circuit block diagram of a switch-mode power supply apparatus according to a first embodiment of the present disclosure. In FIG. 1, the switch-mode power supply apparatus (hereafter "power supply apparatus") 10 includes a power conversion module 100 and a controlling module 120. The controlling module 120 provides peak current mode control for the power conversion module 100. The power supply apparatus 10 is, for example, a direct current (DC) to DC power supply apparatus, an alternative current (AC) to DC power supply apparatus, or a DC to AC power supply apparatus.

The power conversion module 100 is further driven to be operating in continuous-conduction mode (CCM) by the controlling module 120. When the power conversion module 100 is operating in CCM, an inductor current $i_L$ flowing through the inductor L thereof does not decrease to zero in the switching cycle (e.g., see FIG. 3). In the other words, CCM is a mode of the power conversion module 100 operation wherein the inductor current $i_L$ through the inductor L never reaches zero during the switching cycle.

The power conversion module 100 receiving an input voltage $V_{IN}$ is configured to convert the analog input power $V_{IN}$ into an output voltage $V_{OUT}$ based on a pulse-width-modulating signal PWM generated by the controlling module 120.

Figure 2:
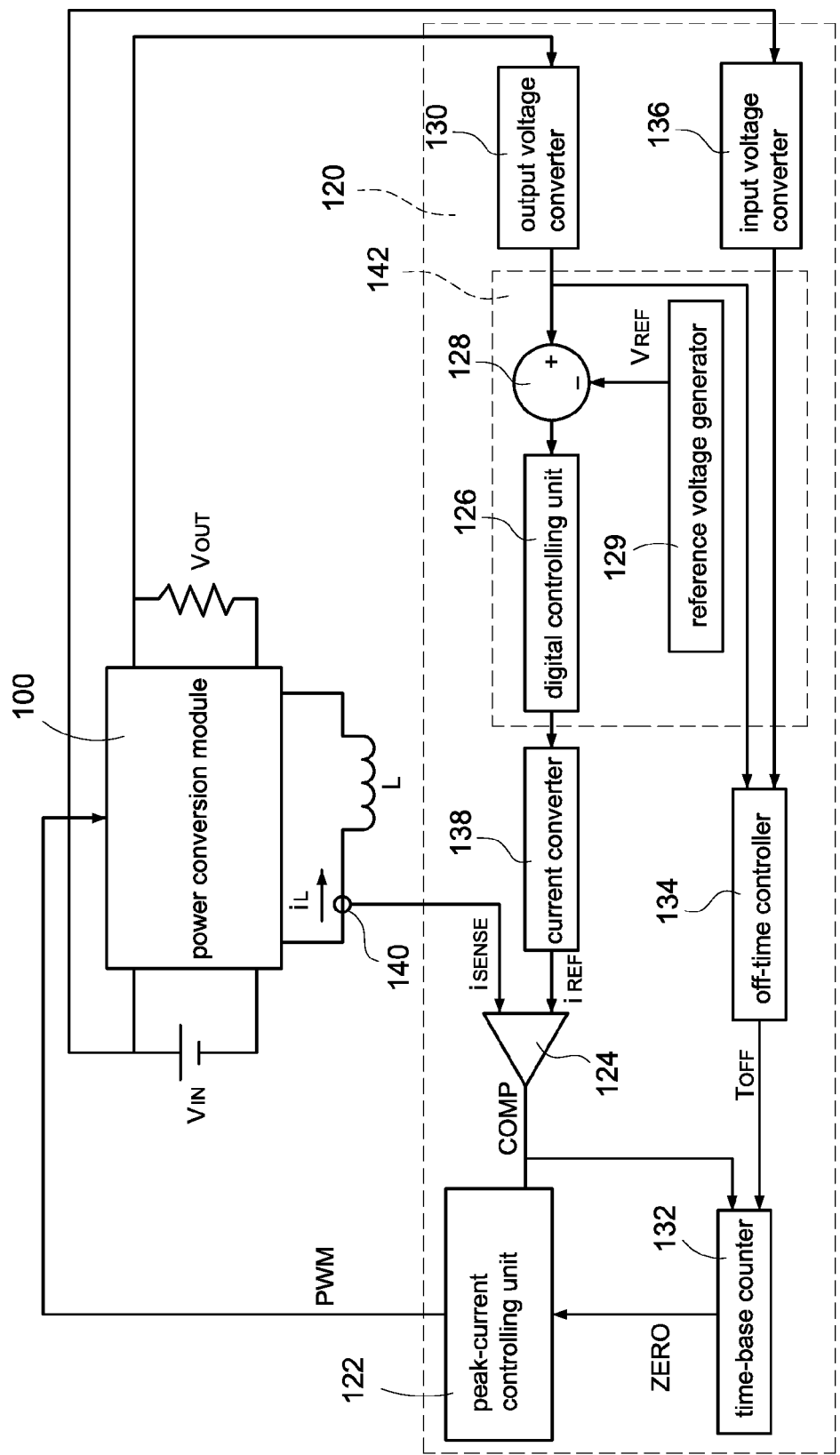
FIG. 2 is a circuit block diagram of a switch-mode power supply apparatus according to a second embodiment of the present disclosure.

Reference is made to FIG. 2, which is a circuit block diagram of a switch-mode power supply apparatus according to a second embodiment of the present disclosure. In FIG. 2, the power conversion module 100 is a DC to DC power conversion module, which receives a DC input voltage $V_{IN}$ and converts the input voltage $V_{IN}$ into a DC output voltage $V_{OUT}$. The controlling module 120 is electrically connected to the power conversion module 100 and is configured to control operations of the power conversion module 100 based on the input voltage $V_{IN}$, the output voltage $V_{OUT}$, and an inductor current $i_L$ thereof.

The controlling module 120 includes a peak-current controlling unit 122, a current comparator 124, a digital controlling unit 126, a voltage comparator 128, a reference voltage generator 129, an output voltage converter 130, a time-base counter 132, an off-time controller 134, an input voltage converter 136, a current converter 138, and a current sensor 140.

The peak-current controlling unit 122 is configured to transmit the signal generated by the controlling module 120 to the power conversion module 100 for controlling the operation thereof. The current comparator 124 receives signals sent from the current sensor 140 and the current converter 138 and outputs a signal to the peak-current controlling unit 122 and the time-base counter 132. The output voltage converter 130 receives the output voltage $V_{OUT}$ of the power conversion module 100 and outputs a signal to the current-command generating unit 142. The current-command generating unit 142 is configured to generate a signal to the current converter 138. The time-base counter 132 receives signals sent from the off-time controller 134 and the current comparator 124 and outputs a signal to the peak-current controlling unit 122. The off-time controlling 134 receives signals sent from the input voltage converter 130 and the output voltage converter 136. The input voltage converter 136 receives the input voltage $V_{IN}$ of the power conversion module 100.

The output voltage converter 130 is an analog to digital converter (ADC). The output voltage converter 130 receives the output voltage $V_{OUT}$ of the power conversion module 100 and converts the output voltage $V_{OUT}$ into a digital output voltage signal.

The voltage comparator 128 receives the digital output voltage signal sent from the output voltage converter 130 and a reference voltage $V_{REF}$ generated by the reference voltage generator 129 and generates a voltage compare signal based on a comparison between the digital output voltage signal and the reference voltage $V_{REF}$. The voltage compare signal is then transmitted to the digital controlling unit 126. The digital controlling unit 126 receives the voltage compare signal and generates a digital reference current signal based on the voltage compare signal. The digital controlling unit 126 with feedback compensation control is configured to regulate the output voltage $V_{OUT}$. The digital controlling unit 126 can be any digital controlling method, such as digital proportional-integral-derivative (PID) control algorithm.

The current converter 138 is a digital to analog converter (DAC). The current converter 138 receives the digital reference current signal and converts the digital reference current signal into an analog reference current signal $i_{REF}$. The current sensor 140 is, for example, a current transformer circuit or shunt resistors. The current sensor 140 is configured to sense the analog inductor current $i_L$ passing through the inductor L and then generate an analog current sense signal $i_{SENSE}$.

The current comparator 124 receives the current sense signal $i_{SENSE}$ provided by the current sensor 140 and an analog reference current signal $i_{REF}$ sent from the current converter 138, and compares the current sense signal $i_{SENSE}$ against the analog reference current signal $i_{REF}$ so that a current compare signal COMP is generated. The current compare signal COMP is outputted from an output terminal of the current comparator 124 and transmitted to the peak-current controlling unit 122 and the time-base counter 132.

The input voltage converter 136 is an analog to digital converter (ADC). The input voltage converter 136 receives the input voltage $V_{IN}$ of the power conversion module 100 and converts the input voltage $V_{IN}$ into a digital input voltage signal.

The off-time controller 134 receives the digital input voltage signal and the digital output voltage signal and generates an off-time control signal $T_{OFF}$ based on the digital input voltage signal and the digital output voltage signal. The off-time control signal $T_{OFF}$ is then transmitted to the time-base counter 132.

The time-base counter 132 receives the off-time control signal $T_{OFF}$ provided by the off-time controller 134 and then generates a trigger signal ZERO, which is transmitted to the peak-current controlling unit 122 when an off-time interval established by the off-time controller 134 elapses.

The peak-current controlling unit 122 is, for example, a SR flip flop. The peak-current controlling unit 122 generates a pulse-width-modulating signal PWM based on the trigger signal ZERO and sends the pulse-width-modulating signal PWM to the power conversion module 100 for controlling the operation thereof, such that the power switch of the power conversion module 100 would be turned off or turned on in accordance with the pulse-width-modulating signal PWM. Specifically, the pulse-width-modulating signal PWM for turning the power switch off is provided when the peak-current controlling unit 122 receives the current compare signal COMP, and the pulse-width-modulating signal PWM for turning the power switch on is provided when the peak-current controlling unit 122 receives the trigger signal ZERO.

Generally, when the off period (or called off-time) of the power switch of the power conversion module 100 is $T_{OFF}$, and the on period (or called on-time) of the power switch is $T_{ON}$, a full switching cycle (or called switching period) of the power switch $T_S$ is defined as follows:

$$T_S = T_{OFF} + T_{ON}$$

Figure 3:
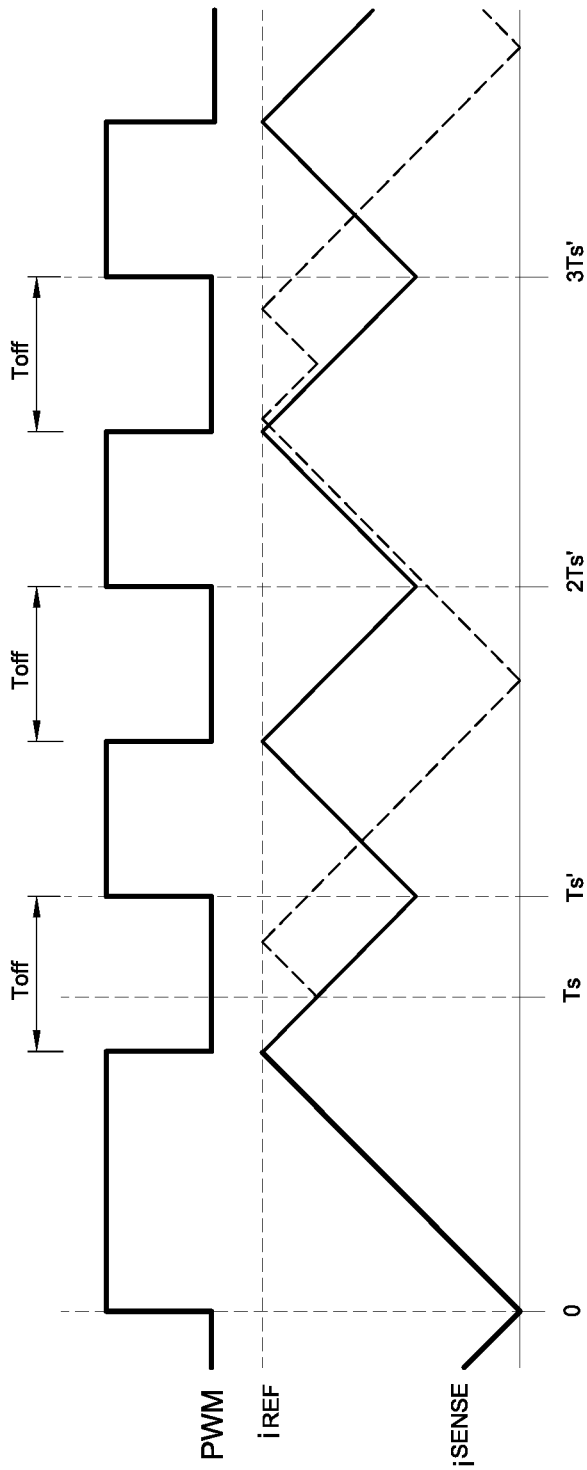
FIG. 3 shows the analog current sense signals in CCM with peak current mode control and DCM.

Furthermore, the peak current mode control refers to a control in which the peak value of the inductor current $i_L$ tracks the analog reference current signal $i_{REF}$, when the analog current sense signal $i_{SENSE}$ reaches the analog reference current signal $i_{REF}$, the power switch of the power conversion module 100 is turned off, and the analog current sense signal $i_{SENSE}$ begins to decrease (as time points between 0 and Ts shown in FIG. 3). In the other words, the on period of the power switch is defined by the analog current sense signal $i_{REF}$, and is unpredictable. Thus the power conversion module 100 will not be operating in CCM when the pulse-width-modulating signal PWM with long on period (or called the pulse-width-modulating signal PWM with short off period) (as dotted line shown in FIG. 3). The present disclosure controls the off period of the pulse-width-modulating signal PWM for controlling the power switch to make the power conversion module 100 operating in CCM, and a slope compensation scheme is omitted.

Based on principle of volt-seconds balance, the following condition is satisfied when the power conversion module 100 is operated in CCM:

$$T_{OFF} = T_S \times \frac{V_{IN}}{V_{OUT}};$$

wherein, $T_S$ is the switching period of the power switch of the power conversion module 100;

$T_{OFF}$ is the off period of the power switch;

$V_{IN}$ is the input voltage of the power conversion module 100; and $V_{OUT}$ is the output voltage of the power conversion module 100.

In accordance with the condition mentioned above, the power conversion module 100 can be operated in CCM (as solid line shown in FIG. 3) by controlling the off period ($T_{OFF}$) of the power switch when the input voltage ($V_{IN}$) and the output voltage ($V_{OUT}$) of the power conversion module 100 are fixed. Specifically, in the conventional peak current control mode, if load increases, the analog reference current signal $i_{REF}$ will increase and the on period of the power switch will increase accordingly. Since the switching period of the power switch is a constant, the off period of the power switch shortens, and the power conversion module 100 transition from CCM to DCM (as dotted line shown in FIG. 3) when next on period is coming.

In the present disclosure, the controlling module 120 controls the off period of the power switch, so as to sustain the predetermined off-time of the power switch. Therefore, the switching period of the power switch temporarily extends in one period (as time points between 0 and Ts' shown in FIG. 3) and then recovers the original period time during CCM (i.e. the time period between time points Ts' and 2Ts' equals to that between time points 0 and Ts, and the time period between time points 2Ts' and 3Ts' also equals to that between time points 0 and Ts). Besides, according to the above principle of volt-seconds balance, when the power conversion module 100 has the fixed input voltage and the output voltage, if the off time is controlled to be a fixed value the period time is fixed, too.

Figure 4:
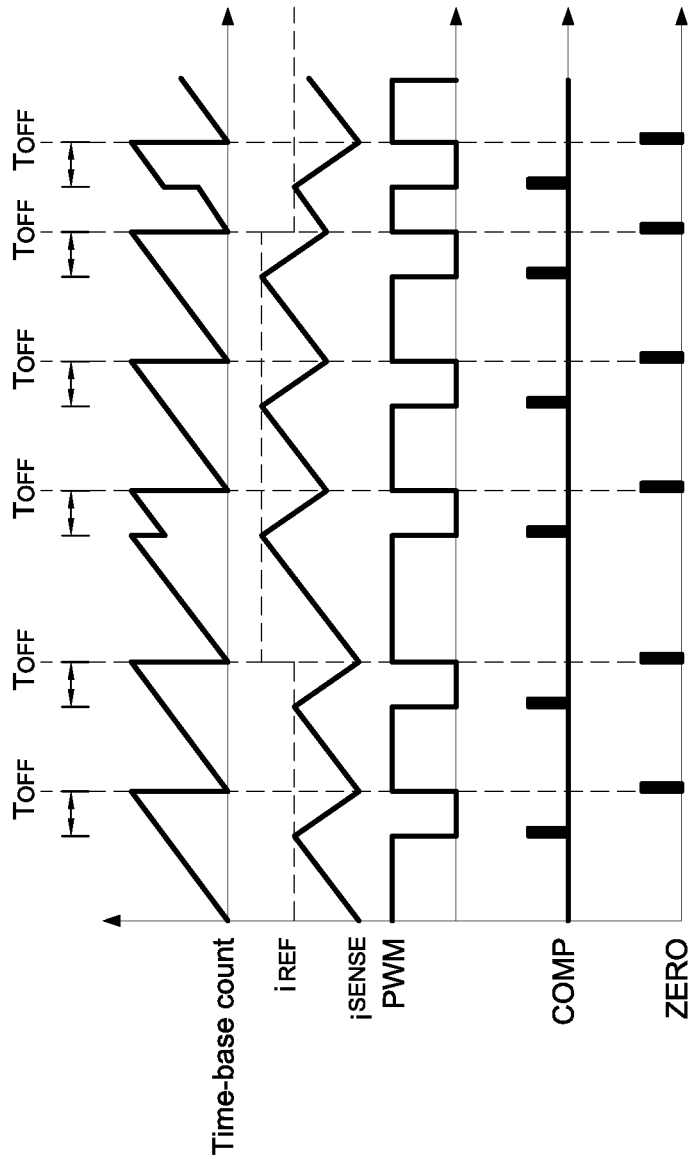
FIG. 4 is a timing chart indicating the operations of the power supply apparatus according to the second embodiment of the present disclosure.

Reference is made to FIG. 2 and FIG. 4. FIG. 4 is a timing chart indicating the operations of the power supply apparatus according to the second embodiment of the present disclosure, and shows the counting signal "Time-base count", the analog reference current signal "$i_{REF}$", the analog current sense signal "$i_{SENSE}$", the pulse-width-modulating signal "PWM", the current compare signal "COMP", and the trigger signal "ZERO" of the controlling module 120.

In operation, the controlling module 120 catches the input voltage $V_{IN}$, the output voltage $V_{OUT}$, and the analog inductor current $i_L$. Specifically, the input voltage $V_{IN}$ is receives and converted into the digital input voltage signal by the input voltage converter 136, the output voltage $V_{OUT}$ is received and converted into the digital output voltage signal by the output voltage converter 130, and the analog inductor current $i_L$ is received and converted into the analog current sense signal $i_{SENSE}$ by the current converter 140.

The digital output voltage signal is then transmitted to the off-time controller 134 and the voltage comparator 128. The off-time controller 134 generates the off-time control signal $T_{OFF}$ based on the digital output voltage signal. The voltage comparator 128 generates the voltage compare signal based on a comparison between the digital output voltage signal and the reference voltage $V_{REF}$ generated from the reference voltage generator 129. The voltage compare signal is then transmitted to the digital controlling unit 126.

The digital controlling unit 126 receives the voltage compare signal and generates the digital reference current signal based on the voltage compare signal. The digital reference current signal is then converted into analog reference current signal $i_{REF}$ and transmitted to the current comparator 124. The current comparator 124 compares the analog current sense signal $i_{SENSE}$ against the analog reference current signal $i_{REF}$ so that a current compare signal COMP is generated. The reference current signal COMP is transmitted to the peak-current controlling unit 122 and the time-base counter 132. In should be noted that the current comparator 124 may generate the current compare signal COMP when the analog current sense signal $i_{SENSE}$ equals to the analog reference current signal $i_{REF}$. However, the current comparator 124 may generate the current compare signal COMP not only when the analog current sense signal $i_{SENSE}$ equals to the analog reference current signal $i_{REF}$ but also when the analog current sense signal $i_{SENSE}$ is different from the analog reference current signal $i_{REF}$. Specifically, the current compare signal COMP can be a logic high signal when the analog current sense signal $i_{SENSE}$ equals to the analog reference current signal $i_{REF}$, and the current compare signal COMP can be a logic low signal when the analog current sense signal $i_{SENSE}$ is different from the analog reference current signal $i_{REF}$.

The time-base counter 132 receives the current compare signal COMP (with logic high level) and sends the trigger signal ZERO to turn the power switch on when the off-time interval established by the off-time control signal $T_{OFF}$ elapses. In the present disclosure, no matter whether the length of the on period of the power switch is varied, the off-time interval is a constant. Thus the period length of the switching period can vary. Specifically, the switching period is temporarily extended when the reference current signal $i_{RFE}$ suddenly increases (as the third period shown in FIG. 4), and the switching period recovers from the extended switching period (as the fourth period shown in FIG. 4)

thereafter. This is different from the conventional peak current mode control to periodically turn the power switch on in a predetermined switching period (i.e. the switching period of the conventional peak current mode control cannot vary). As such, the power conversion module 100 has an advantage of short response time and the slope compensation scheme is omitted.

It should be noted that the digital controlling unit 126, and voltage comparator 128, and the reference voltage generator 129 may be integrated into a current-command generating unit 142 as shown in FIG. 2. The current-command generating unit 142 receives the digital output voltage signal and then generates the digital reference current signal. The current-command generating unit 142 generates the voltage comparing signal based on a comparison between the digital output voltage signal and the reference voltage $V_{REF}$, and then converting the voltage comparing signal into the digital reference current signal. The controlling module 120 may be an integrated circuit which can make the power conversion module 100 to be operating in CCM based on the input voltage $V_{IN}$, the output voltage $V_{OUT}$, and the inductor current $i_L$.

To sum up, the peak current mode controlling method of the switch-mode power supply apparatus of the present disclosure includes following steps: first, the controlling module 120 generates the off-time controlling signal based on the input voltage $V_{IN}$ and the output voltage $V_{OUT}$ of the power conversion module 100; the controlling module 120 further generates the voltage compare signal based on the reference voltage against the output voltage $V_{OUT}$. Thereafter, the controlling module 120 generates the reference current signal based on the voltage compare signal and generates the current compare signal when the analog inductor current $i_L$ equals to the analog reference current signal $i_{REF}$. After that, the controlling module 120 generates the trigger signal ZERO for triggering the pulse-width-modulating signal which controls the operation of the switch power of the power conversion module 100 when an off-time interval established by the off-time control signal elapses.

Figure 5:
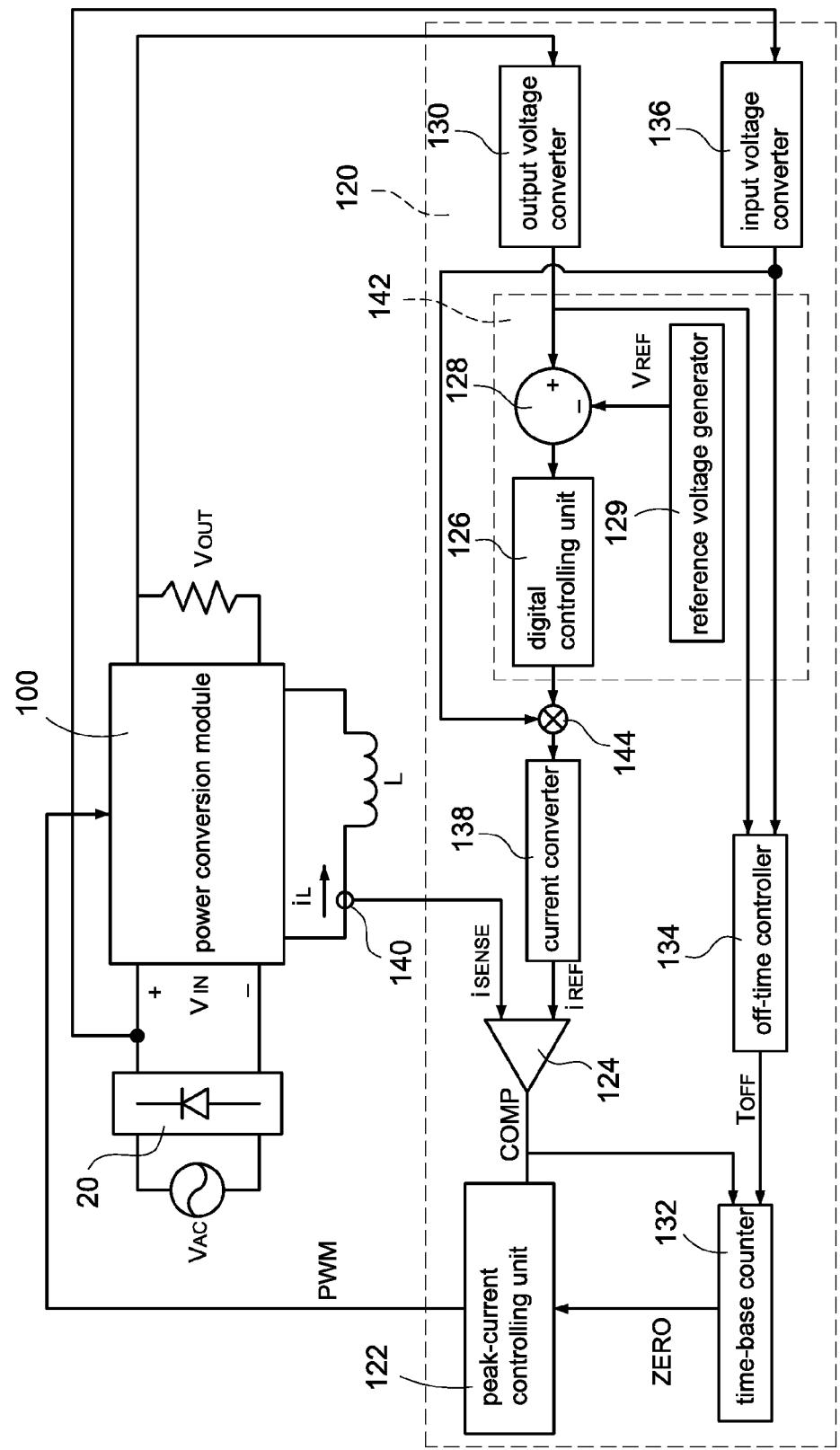
FIG. 5 is a circuit block diagram of a switch-mode power supply apparatus according to a third embodiment of the present disclosure.

Reference is made to FIG. 5, which is a switch-mode power supply apparatus according to a third embodiment of the present disclosure. In FIG. 5, the power conversion module 100 is electrically connected to a rectifier 20, and receives a pulsating DC voltage outputted from the rectifier 20. In the other words, the input voltage $V_{IN}$ enters the power conversion module 100 is the pulsating DC voltage. The rectifier 20 is, for example, bridge rectifier, and the power conversion module 100 is, for example, power factor corrector.

The controlling module 120 shown in FIG. 5 is similar to that of shown in FIG. 2, and the same reference numbers are used in the drawings and the description to refer to the same parts. It should be noted that the scheme for the power factor corrector is used to control the input current waveform so that it approximates the shape of the input voltage waveform. Thus a multiplier 144 is included in the controlling module 120 shown in FIG. 5. The multiplier 144 receives the digital reference current signal generated by the current-command generating unit 142 and the digital input voltage signal generates by the input voltage converter 136, and sends a product of the reference current signal and the input voltage transmit to the current comparator 124, wherein the product is the reference current signal for the power factor corrector. According to the principle of volt-seconds balance mentioned above, the power switch of the power factor corrector has fixed switching period when the off period is vary based on the varied input voltage proportionally. The function and relative description of other components of the controlling module 120 shown in the FIG. 5 are the same as that of shown in FIG. 2 mentioned above and are not repeated here for brevity, and the controlling module 120 shown in the FIG. 5 can achieve the functions as the controlling module 120 shown in FIG. 2 does.

Figure 7:
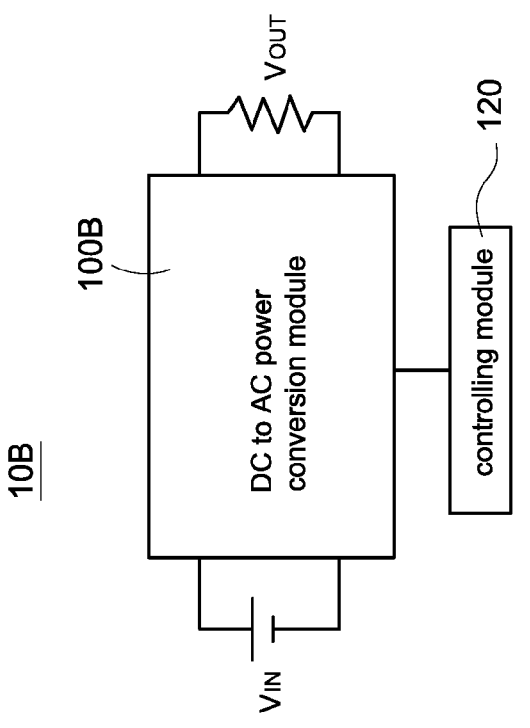
FIG. 7 is a circuit block diagram of a switch-mode power supply apparatus according to a fifth embodiment of the present disclosure.
Figure 6:
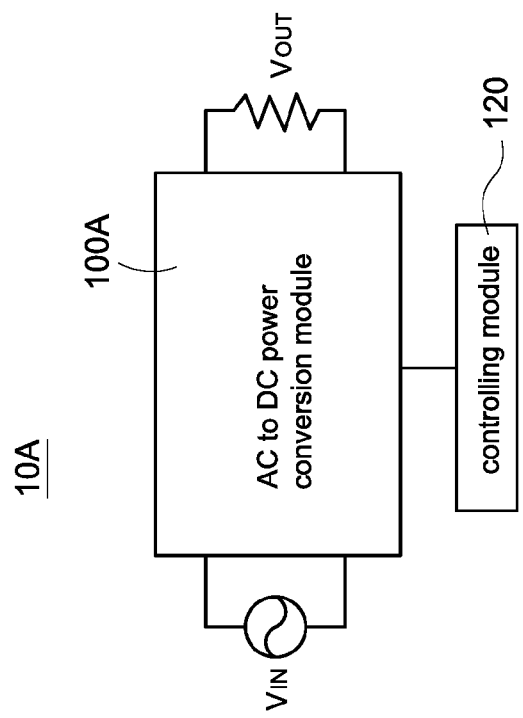
FIG. 6 is a circuit block diagram of a switch-mode power supply apparatus according to a forth embodiment of the present disclosure.

The controlling module 120 may further applied to the AC to DC power conversion module 100A shown in FIG. 6 and the DC to AC power conversion module 100B shown in FIG. 7, and the controlling module 120 provides peak current mode control for the AC to DC power conversion module 100A and the DC to AC power conversion module 100B.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A controlling module applied to control a power conversion module receiving an input voltage and generating an output voltage, the controlling module comprising:
   a current-command generating unit electrically connected to the power conversion module, wherein the current-command generating unit generates a reference current signal based on the input voltage;
   a current sensor configured to sense an inductor current of the power conversion module for generating a current sense signal;
   a current comparator configured to generate a current compare signal when the current sense signal equaling to the reference current signal;
   an off-time controller generating an off-time control signal based on the input voltage and the output voltage;
   a time-base counter receiving the current compare signal and the off-time control signal and generating a trigger signal when an off-time interval established by the off-time control signal elapsing; and
   a peak-current controlling unit configured to make a power switch of the power conversion module in a conducting state in accordance with the trigger signal.

2. The controlling module of claim 1, wherein the current-command generating unit comprising:
   a reference voltage generator configured to generate a reference voltage;
   a voltage comparator receives the output voltage and the reference voltage and generates a voltage compare signal based on a comparison between the output voltage and the reference voltage; and
   a digital controlling unit configured to generate the reference current signal based on the voltage compare signal.

3. The controlling module of claim 2, further comprising:
   an input voltage convertor electrically connected to the off-time controller;
   an output voltage converter electrically connected to the voltage comparator; and
   a current convertor arranged between the digital controlling unit and the current comparator and electrically connected to the digital controlling unit and the current comparator.

4. The controlling module of claim 1, further comprising a multiplier arranged between the current-command generating unit and the current comparator, wherein the multiplier makes a product of the reference current signal and the input voltage transmit to the current comparator.

5. A switch-mode power supply apparatus comprising:
a power conversion module receiving an input voltage and then generating an output voltage comprising an inductor and a power switch electrically connected to the inductor; and
a controlling module comprising:
  a current-command generating unit electrically connected to the power conversion module and configured to generate a reference current signal based on the output voltage;
  a current sensor configured to generate a current sense signal based on an inductor current passing through the inductor;
  a current comparator electrically connected to the current-command generating unit and the current sensor, wherein the current comparator configured to generate a current compare signal when the current sense signal equals to the reference current signal;
  an off-time controller configured to generate an off-time control signal based on the input voltage and the output voltage;
  a time-base counter electrically connected to the current comparator and the off-time controller, wherein the time-base counter receives the current compare signal and the off-time control signal and generates a trigger signal when an off-time interval established by the off-time control signal elapsing; and
  a peak-current controlling unit configured to make the power switch in a conducting state based on the trigger signal.

6. The apparatus of claim 5, wherein the power conversion module is an alternative current to direct current power converter, a direct current to direct current power converter, or a direct current to alternative current power converter.

7. The apparatus of claim 5, wherein the current-command generating unit comprises:
  a reference voltage generator configured to generate a reference voltage;
  a voltage comparator electrically connected to the power conversion module, wherein the voltage comparator receives the input voltage and the reference voltage and generates a voltage compare signal based on a comparison between the output voltage and the reference voltage;
  a digital controlling unit electrically connected to the voltage comparator and configured to convert the voltage compare signal into a reference current signal.

8. The apparatus of claim 7, further comprising:
  an input voltage converter electrically connected to the off-time controller;
  an output voltage converter electrically connected to the voltage comparator; and
  a current converter arranged between the digital controlling unit and the current comparator and electrically connected to the digital controlling unit and the current comparator.

9. The apparatus of claim 5, further comprising a multiplier arranged between the current-command generating unit and the current comparator, wherein the multiplier makes a product of the reference current signal and the input voltage transmit to the current comparator.

* * * * *